(12) United States Patent
Peng et al.

(10) Patent No.: US 8,848,358 B2
(45) Date of Patent: *Sep. 30, 2014

(54) SERVER WITH EXPANSION CARD

(75) Inventors: Wen-Tang Peng, New Taipei (TW); Hai-Chen Zhou, Shenzhen (CN)

(73) Assignees: Hong Fu Jin Precision Industry (ShenZhen) Co., Ltd., Shezhen (CN); Hon Hai Precision Industry Co., Ltd., New Taipei (TW)

( * ) Notice: Subject to any disclaimer, the term of this patent is extended or adjusted under 35 U.S.C. 154(b) by 237 days.

This patent is subject to a terminal disclaimer.

(21) Appl. No.: 13/564,744

(22) Filed: Aug. 2, 2012

(65) Prior Publication Data

US 2013/0120928 A1    May 16, 2013

(30) Foreign Application Priority Data

Nov. 14, 2011    (CN) .......................... 2011 1 0359336

(51) Int. Cl.
| G06F 1/16 | (2006.01) |
| H05K 5/00 | (2006.01) |
| H05K 7/16 | (2006.01) |
| H05K 1/14 | (2006.01) |
| H05K 7/02 | (2006.01) |
| G06F 1/18 | (2006.01) |

(52) U.S. Cl.
CPC ..................... G06F 1/185 (2013.01)
USPC ................. 361/679.32; 361/679.31; 361/724; 361/727; 361/740; 361/807; 361/810

(58) Field of Classification Search
USPC ........................ 361/679.31–679.32, 724–729, 361/735–737, 740–741, 807, 810; 312/223.1, 223.2
See application file for complete search history.

(56) References Cited

U.S. PATENT DOCUMENTS

| 5,831,821 | A | * | 11/1998 | Scholder et al. | .......... 361/679.32 |
| 6,288,911 | B1 | * | 9/2001 | Aoki et al. | ..................... 361/801 |
| 6,711,023 | B2 | * | 3/2004 | Yen | ................................ 361/740 |
| 7,375,980 | B2 | * | 5/2008 | Peng et al. | ..................... 361/801 |
| 7,499,289 | B2 | * | 3/2009 | Liang | ............................. 361/796 |
| 7,990,732 | B2 | * | 8/2011 | Kuo et al. | ..................... 361/754 |
| 7,990,735 | B2 | * | 8/2011 | Yeh et al. | ..................... 361/801 |
| 7,990,736 | B2 | * | 8/2011 | Chen et al. | ..................... 361/802 |

(Continued)

FOREIGN PATENT DOCUMENTS

| JP | S50-032431 | 10/1975 |
| JP | H03-113885 U | 11/1991 |
| JP | H04-074488 U | 6/1992 |
| WO | 03/041470 A1 | 5/2003 |

*Primary Examiner* — Nidhi Desai
(74) *Attorney, Agent, or Firm* — Novak Druce Connolly Bove + Quigg LLP (57) ABSTRACT

A server includes a main board, a side panel having an attached female connector, an expansion card, and a lever. The expansion card includes a latching member having a pivot and a male connector. The lever includes an engaging portion defining a slot, and a main body connected to the engaging portion and pivotally connected to the main board. When the lever is rotated in a first direction, the pivot is slid into the slot, causing the engaging portion to engage with the latching member. Further rotating the lever in the first direction, the expansion card is urged to move toward the side panel until the male connector mate with the female connector. When the lever is rotated in a second direction opposite to the first direction, the expansion card is urged to move away from the side panel, causing the male connector to disengage from the female connector.

14 Claims, 7 Drawing Sheets

(56) References Cited

U.S. PATENT DOCUMENTS

| | | | |
|---|---|---|---|
| 8,072,767 B2 * | 12/2011 | Xue | 361/755 |
| 8,437,139 B2 * | 5/2013 | Peng et al. | 361/748 |
| 2006/0067061 A1 * | 3/2006 | Shimada et al. | 361/726 |

* cited by examiner

SERVER WITH EXPANSION CARD

BACKGROUND

1. Technical Field

The present disclosure relates to servers, and particularly, to a server with an expansion card.

2. Description of Related Art

Expansion cards are widely employed in a server. However, some expansion cards are mounted to a side panel of the housing of the server. Because the side panel is parallel to the inserting direction of the expansion card, which may bring trouble to mount or remove the expansion card.

BRIEF DESCRIPTION OF THE DRAWINGS

The components of the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

The embodiments of the present disclosure are now described in detail, with reference to the accompanying drawings.

FIGS. 1-4 show a server 10 in accordance with one embodiment. The server 10 includes a main board 12, a side panel 16, an expansion card 20, and a lever 18. The side panel 16 is perpendicularly connected to one end of the main board 12. A retaining assembly 160 and a card 165 are attached to one side of the side panel 16. The retaining assembly 160 contacts the main board 12. The retaining assembly 160 includes a first fixing member 1601 and a second fixing member 1602 spaced from the first fixing member 1601. The card 165 is fixed between the first fixing member 1601 and the second fixing member 1602, and is substantially perpendicularly connected to the main board 12. Two female connectors 161 are arranged on one side of the card 165 away from the side panel 16. The female connectors 161 extend along the lengthwise direction of the card 165, and substantially parallel to the main board 12. Of course, the number of the female connectors 161 can be varied according need.

Figure 1:
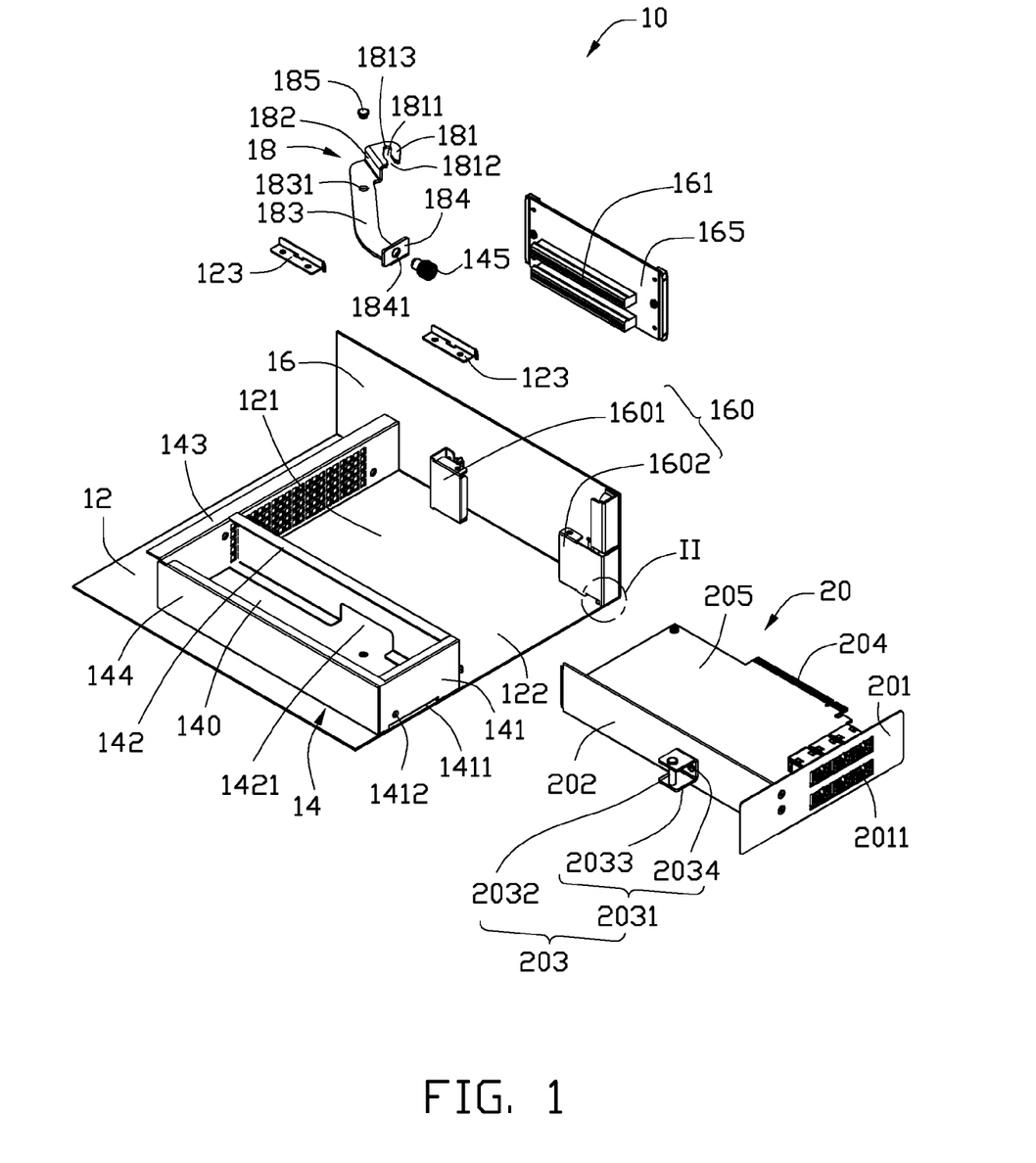
FIG. 1 is an exposed, isometric view of a server in accordance with an exemplary embodiment.
Figure 2:
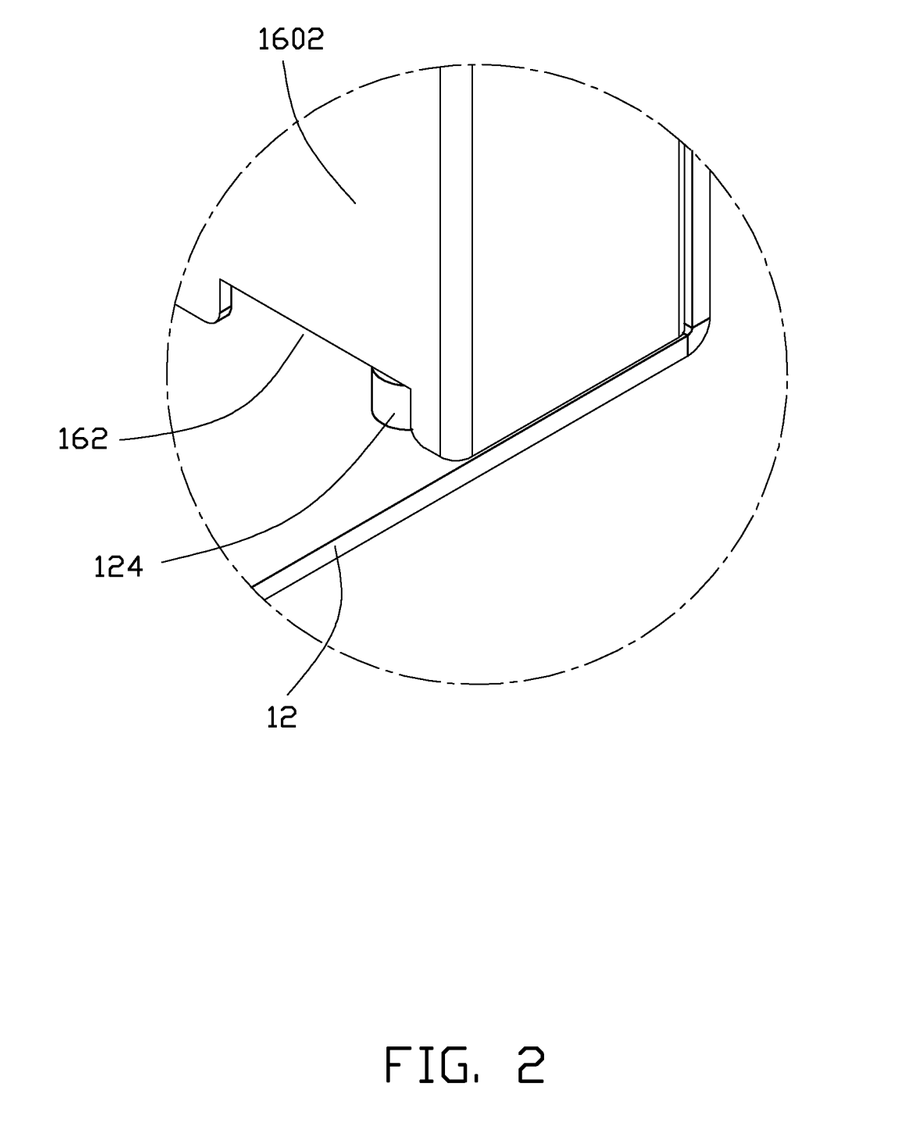
FIG. 2 is an enlarged view of circled portion II of FIG. 1.

A positioning assembly 14 is attached to the main board 12. The positioning assembly 14 includes a first wall 141, a second wall 142, a third wall 143, and a fourth wall 144. The first wall 141, the second wall 142, the third wall 143, and the fourth wall 144 are connected to each other in turn, and are substantially perpendicular to the main board 12. The first wall 141 is substantially parallel to the third wall 143 and perpendicular to the second wall 142. The first wall 141 defines a first opening 1411 adjacent to the main board 12. The first wall 141 further defines a thread hole 1412 above the first opening 1411. The central axis of the thread hole 1412 is substantially perpendicular to the first wall 141. The thread hole 1412 is to engage with a screw 145 to fix the lever 18. The second wall 142 is substantially parallel to the fourth wall 144. The second wall 142 defines a second opening 1421 adjacent to the main board 12.

The third wall 143 extends from the fourth wall 144 to the side panel 16. The second wall 142, the third wall 143, and the side panel 16 cooperatively define a first receiving space 121 to receive the expansion card 20. The receiving space 121 includes an expansion card slot 122. The expansion card 20 can move into or out of the first receiving space 121 through the expansion card slot 122. The first wall 141, the second wall 142, the third wall 143, and the fourth wall 144 cooperatively define a second receiving space 140 to receive a portion of the latching member 18. The second receiving space 140 is in communication with the first receiving space 121 through the second opening 1421 of the second wall 142. Two limiting members 123 are fixed to the main board 12. The limiting members are spaced from each other and substantially parallel to the side panel 16. The limiting members 123 are arranged adjacent to the second wall 142. The limiting members 123 and the side panel 16 cooperatively define the moving range of the expansion card 20.

Figure 3:
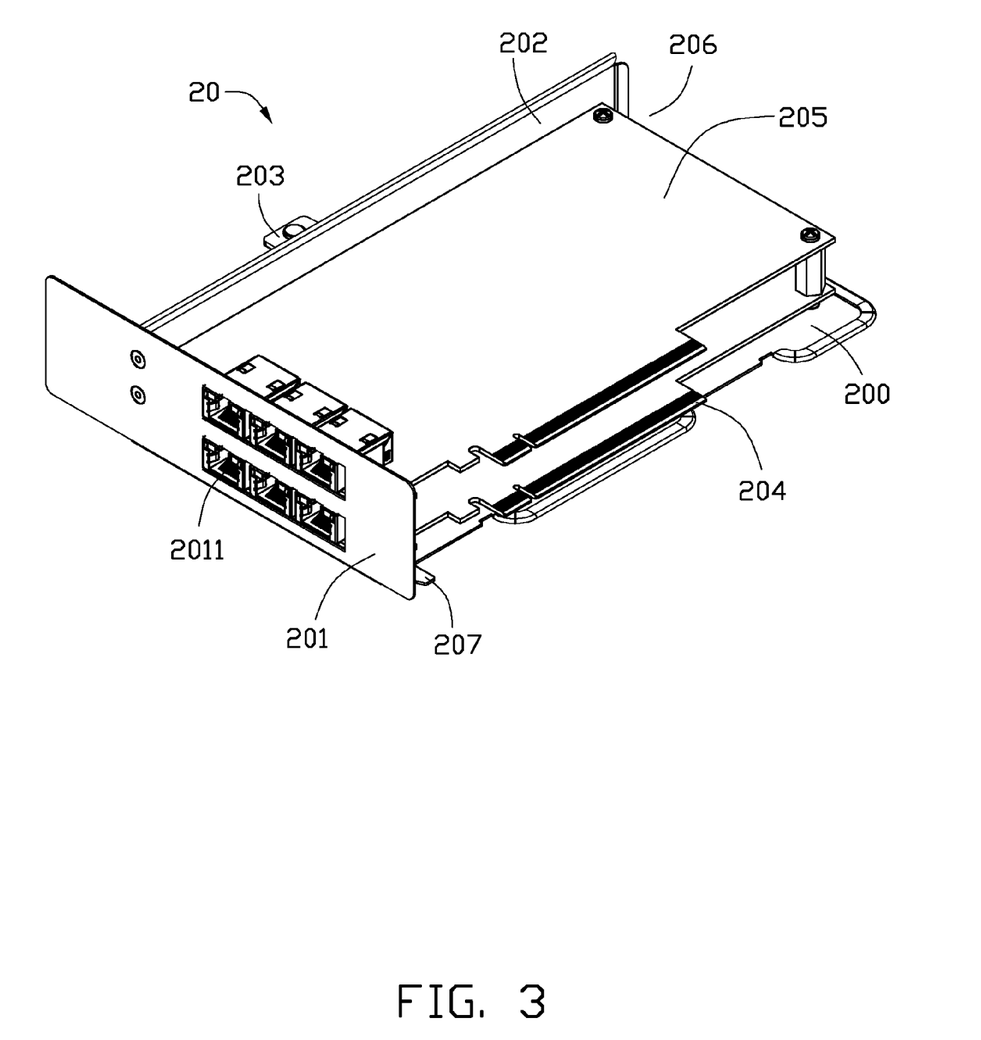
FIG. 3 is an isometric view of an expansion card of FIG. 1, viewing from another perspective.

The expansion card 20 includes a base 200, an end plate 201, a side plate 202, a latching member 203, and two circuit boards 205. The base 200, the end plate 201, and the side plate 202 cooperatively define a receiving space 206 to receive the circuit boards 205. The base 200 and the side plate 202 are connected to one side of the end plate 201. At least one port 2011 is arranged in the opposite side of the end plate 201 and is used to connect to peripheral devices. The end plate 201, the side plate 202, and two circuit boards 205 are substantially perpendicularly connected to each other. The latching member 203 and the circuit boards 205 are connected to the opposite sides of the side plate 202.

The latching member 203 includes a rack 2031 and a pivot 2032. The rack 2031 includes two tabs 2033 and a connecting tab 2034. The two tabs 2033 are parallel to and spaced apart from each other. The connecting tab 2034 is substantially perpendicular connected to one end of each tab 2033. The connecting tab 2034 is fixed to the side plate 202 to secure the rack 2031 to the side plate 202. The pivot 2032 is substantially perpendicularly connected between the opposite end of each tab 2033, and keep a distance from the connecting tab 2034 to define a space. The number of the circuit board 205 is corresponding to the female connected 161. Each circuit board 205 includes a male connector 204. Each male connector 204 is arranged on one edge of the circuit board 205 away from the side plate 202. Each male connector 204 is to couple with one female connector 161 to communicate with the main board 12. When the expansion card 20 is completely received in the first receiving space 121, each female connector 161 is aligned with one male connector 204.

The lever 18 includes an engaging portion 181, a connecting portion 182, a main body 183, and a fixing portion 184. The engaging portion 181 is substantially parallel to the main body 183 and substantially perpendicular to the connecting portion 182. The engaging portion 181 is adjacent to the second opening 1421 and away from the first opening 1411. The engaging portion 181 defines a slot 1811 to receive the pivot 2032. The slot 1811 includes an open end 1812 and a closed end 1813. The slot 1811 is arc-shaped which can hold the pivot 2032 in the slot 1811.

One end of the connecting portion 182 is substantially perpendicularly connected to the engaging portion 181, and the opposite end of the connecting portion 182 is substantially perpendicularly connected to the main body 183. The main body 183 is spaced from the engaging portion 181 through the connecting portion 182, the distance between the slot 1811 and the main board 12 is between that of the two tabs 2033 to the main board 12, thus, the engaging portion 181 can engage with the pivot 2032.

The opposite end of the main body 183 is connected to the fixing portion 184. The main body 183 is substantially parallel to the main board 12. The main body 183 extends through the first opening 1411 and the second opening 1421, with the engaging portion 181 and the connecting portion 182 located in the first receiving space 121 and the fixing portion 184 external to the second receiving space 140. The main body 183 defines a first through hole 1831 to engage with a pin 185, which pivotally connecting the main body 183 to the main board 12.

The fixing portion 184 is adjacent to the first opening 1411. The fixing portion 184 and the connecting portion 182 are positioned at the same side of the main body 183. The fixing portion 184 defines a second through hole 1841. When the lever 18 is rotated to a position where the second through hole 1841 is aligned with the thread hole 1412, the screw 145 can pass through the second through hole 1841 and can be screwed into the thread hole 1412, to fix the lever 18 to the positioning assembly 14.

Figure 5:
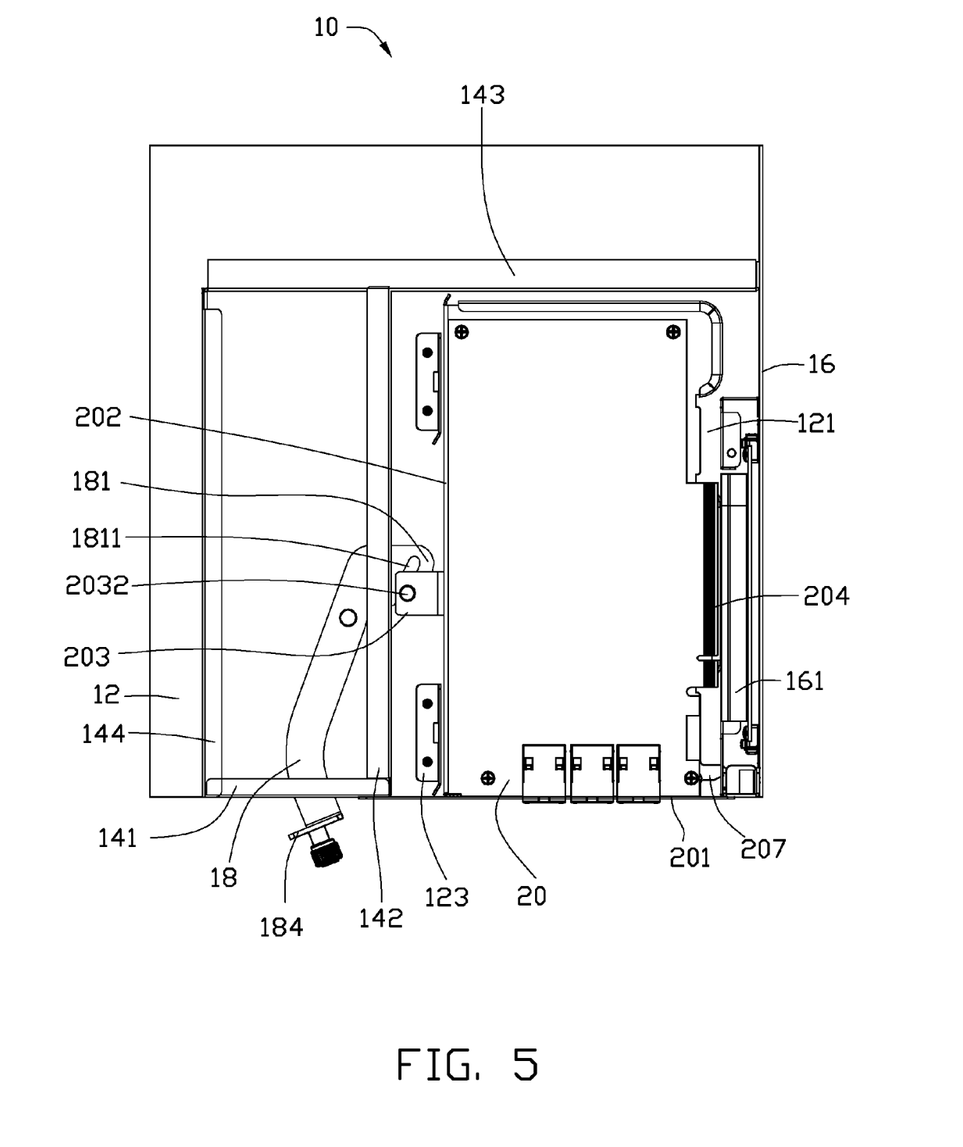
FIG. 5 is perspective view of the server of the FIG. 1, showing a first state of the server.
Figure 6:
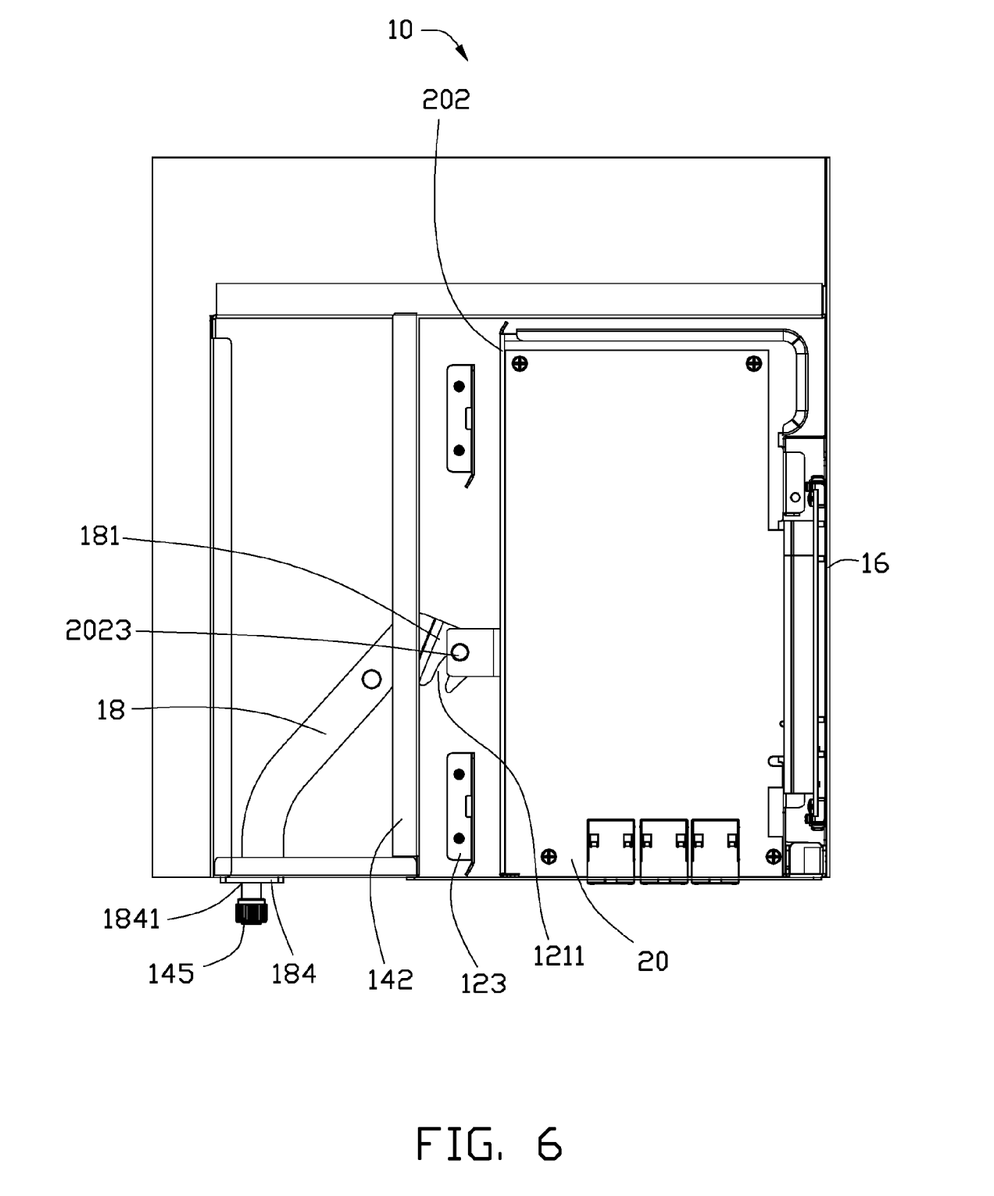
FIG. 6 is similar to FIG. 5, which shows a second state of the server.
Figure 7:
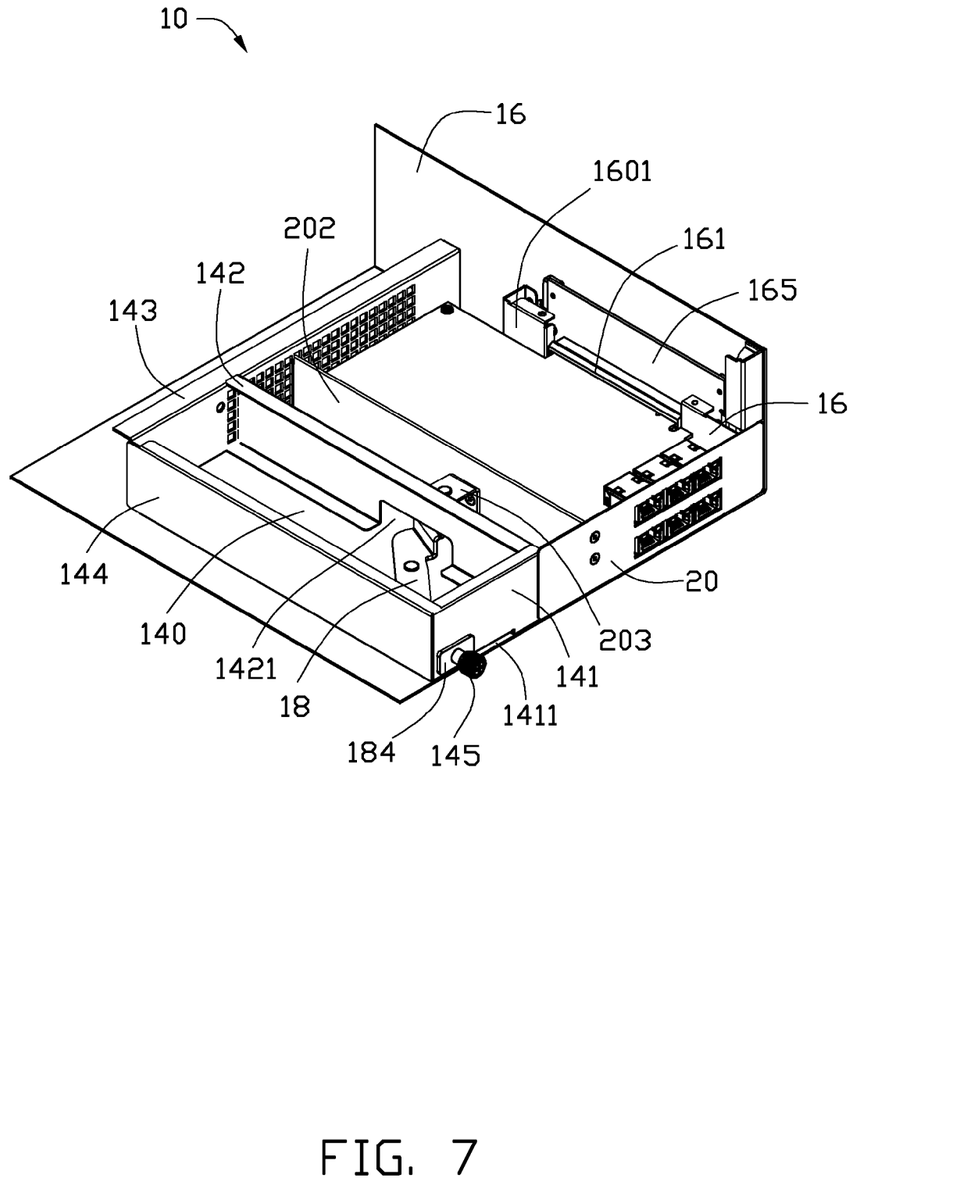
FIG. 7 is an isometric view showing the expansion card assembled on the server.

To assemble the expansion card 20, pushing the expansion card 20 into the first receiving space 121 through the expansion card slot 122 until the expansion card 20 is completely received in the first receiving space 121 (see FIG. 5). The pivot 2032 is then located adjacent to or in the open end 1812 of the slot 1811. Then, rotates the lever 18 in a first direction to cause the engaging portion 181 to move towards the side panel 16, and to cause the fixing portion 184 to move away from the side panel 16. Thus, the pivot 2032 slides into the slot 1811 and abuts against the closed end 1813, the pivot 2032 is engaging with the slot 1811. At the same time, the fixing portion 184 moves toward the first wall 141 and the fourth wall 144. Because the pivot 2032 is engaging with the slot 1811, rotating the lever 18 in the first direction further, causing the engaging portion 181 to urge the expansion card 20 to move toward the side panel 16 until the male connectors 204 mates with the female connectors 161. At the same time, the second through hole 1841 aligns with the thread hole 1412. The screw 145 can then be screwed into the threaded hole 1412 through the second through hole 1841. Thus, the expansion card 20 is assembled in the server 10.

Figure 4:
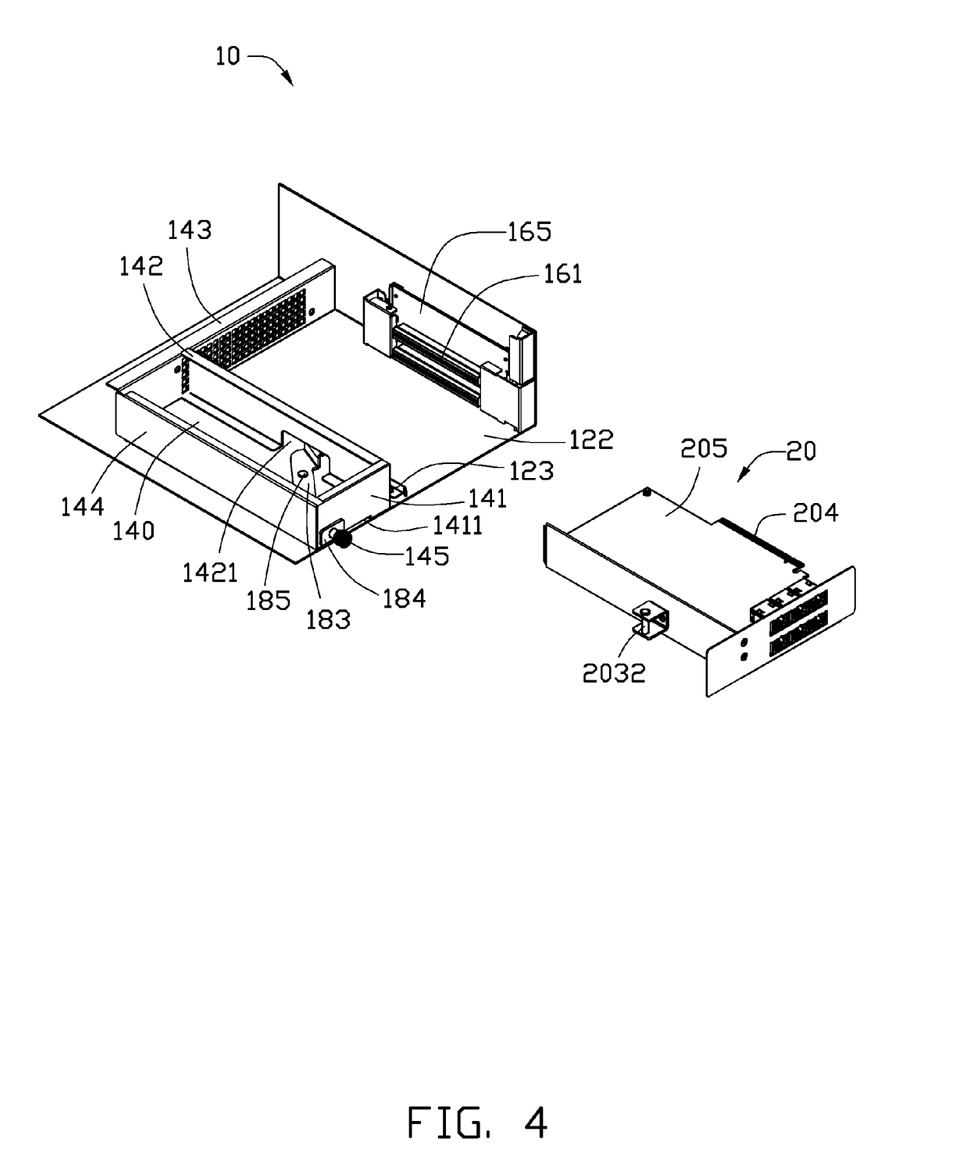
FIG. 4 is an isometric view showing the expansion card disassembly of the server.

To disassemble the expansion card 20, removing the screw 145 from the thread hole 1412, and then rotating the lever 18 in a second direction opposite to the first direction. The engaging portion 181 then moves away from the side panel 16, and the fixing portion 184 moves toward the side panel 16. Because the pivot 2032 is engaging with the slot 1811, the engaging portion 181 urges the expansion card 20 to move away from the side panel 16 until the side plate 202 of the expansion card 20 contacts the two limiting members 123. At the same time, the male connectors 204 disengage from the female connectors 161, and the pivot 2032 moves out of the slot 1811 from the open end 1812. Thus, the expansion card 20 can be moved out of the first receiving space 121 through the expansion card slot 122.

In the embodiment, the expansion card 20 further includes a protruding tab 207 protruding from the one edge of the base 200. The protruding tab 207 and the male connectors 204 are arranged on the same side of the base 200. One side of the second fixing member 1602 further defines a notch 162 adjacent to the main board 12. One limiting bolt 124 is received in the part of the notch 162 away from the first fixing member 1601 and is attached to the main board 12. When the expansion card 20 is assembled in the server 10, the protruding tab 207 is inserted into the notch 162 and engages with the limiting bolt 124, to prevent the expansion card 20 from sliding away from the first receiving space 121 through the expansion card slot 122.

With this configuration, through rotating the lever 18 to bring the male connector 204 to couple with or separate from the female connector 161, which will be convenient for assembling the expansion card 20 in the server 10 or disassembling the expansion card 20 from the server 10.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A server comprising: a main board; a side panel connected to one end of the main board, the side panel comprising at least one female connector attached thereto; an expansion card comprising a latching member and at least one male connector, the latching member comprising a pivot, the at least one male connector and the latching member being positioned at opposite sides of the expansion card, the at least one male connector being to mate with the at least one female connector; and a lever comprising an engaging portion and a main body, the engaging portion defining a slot to receive the pivot, the engaging portion being connected to one end of the main body, the main body being pivotally connected to the main board; wherein when the lever is rotated in a first direction, the engaging portion moves toward the side panel, and the pivot is slid into the slot, which causes the engaging portion to engage with the latching member; when the lever is further rotated in the first direction, the expansion card is urged by the engaging portion to move toward the side panel until the at least one male connector mates with the at least one female connector; and wherein when the lever is rotated in a second direction opposite to the first direction, the engaging portion moves away from the side panel, the expansion card is urged by the engaging portion to move away from the side panel, causing the at least one male connector to disengage from the at least one female connector.

2. The server as described in claim 1, wherein the main body is parallel to the main board.

3. The server as described in claim 1, wherein the slot comprises an open end and a closed end, when the at least one male connector mates with the at least one female connector, the pivot is slide into the slot through the open end and abuts against the closed end of the slot.

4. The server as described in claim 1, wherein a retaining assembly and a card are attached to one side of the side panel, the retaining assembly comprises a first fixing member and a second fixing member spaced from the first fixing member, the card is fixed between the first fixing member and the second fixing member, the at least one female connector is attached to the card.

5. The server as described in claim 4, wherein the expansion card further comprises a base, a protruding tab is protruded from one edge of the base, the protruding tab and the at least one male connector are arranged on the same side of the base; one side of the second fixing member adjacent to the main board further defines a notch, one limiting bolt is received in the part of the notch away from the first fixing member and is attached to the main board, when the at least one male connector couples with the at least one female connector, the protruding tab is inserted into the notch and engages with the limiting bolt.

6. The server as described in claim 5, wherein the expansion card further comprises an end plate, the base and at least one port are arranged on the opposite sides of the end plate.

7. The server as described in claim 6, wherein the expansion card further comprises a side plate and at least one circuit board; the base, the end plate, and the side plate cooperatively define a receiving space to receive the at least one circuit board.

8. The server as described in claim 7, wherein the at least one male connector is arranged on the at least one circuit board.

9. The server as described in claim 1, wherein the server further comprises a positioning assembly which is attached to the main board; the positioning assembly comprises a first wall, a second wall, a third wall, and a fourth wall; the first wall, the second wall, the third wall, and the fourth wall are connected to each other in turn and substantially perpendicular to the main board; the second wall is positioned between the fourth wall and the side panel; the third wall extends from the fourth wall to the side panel; the second wall, the third wall, and the side panel cooperatively define a first receiving space to receive the expansion card; the first receiving space comprises an expansion card slot; the expansion card moves into or out of the first receiving space through the expansion card slot.

10. The server as described in claim 9, wherein the first wall, the second wall, the third wall, and the fourth wall cooperatively define a second receiving space; the first wall adjacent to the main board defines a first opening; the second wall adjacent to the main body defines a second opening; the second receiving space is in communication with the first receiving space; the main body extends through the first opening and the second opening to locate the engaging portion in the first receiving space.

11. The server as described in claim 10, wherein the first wall further defines a thread hole above the first opening, the central axis of the thread hole is substantially perpendicular to the first wall; the lever further comprises a fixing portion located external the second receiving space, the fixing portion and the engaging portion are connected to the opposite ends of the main body, the fixing portion defines a through hole; when the at least one male connector mates with the at least one female connector, the through hole aligns with the thread hole, a screw can pass through the through hole and be screwed into the thread hole to fix the lever to the positioning assembly.

12. The server as described in claim 11, wherein the lever further comprises a connecting portion, one end of the connecting portion is connected to the engaging portion, and the opposite end of the connecting portion is connected to the main body, the distance between the engaging portion and the main board is between that of two tabs of the latching member to the main board, thus the engaging portion can engage with the pivot.

13. The server as described in claim 9 further comprising two limiting members attached to the main body and received in the first receiving space, wherein the limiting members are spaced from each other and substantially parallel to the side panel, the limiting members and the side panel cooperatively define the moving range of the expansion card.

14. The server as described in claim 1, wherein the latching member further comprises two tabs and a connecting tab, the tabs are parallel to each other and spaced from each other, the connecting tab is substantially perpendicularly connected to one end of each tab, the pivot is substantially perpendicularly connected to the opposite end of each tab and keep a distance from the connecting tab to define a space, the pivot engages with the slot through the space.

* * * * *